United States Patent [19]

Mittelstaedt

[11] 3,906,299

[45] Sept. 16, 1975

[54] APPARATUS FOR RAPID BRAKING OF MAGNETIC TAPE

[75] Inventor: Rainer Mittelstaedt, Nurnberg, Germany

[73] Assignee: Grundig E.M.V. Electro-Mechanische Versuchsanstalt, Ruerth, Germany

[22] Filed: Mar. 21, 1974

[21] Appl. No.: 453,370

[30] Foreign Application Priority Data

Mar. 27, 1973 Germany ............................ 2315118

[52] U.S. Cl. ....................... 318/7; 318/87; 318/377; 318/382; 242/55.12

[51] Int. Cl.$^2$ ........................................... B65H 59/38

[58] Field of Search ........................ 318/6, 7, 87–89, 318/377, 382; 242/55.12

[56] References Cited

UNITED STATES PATENTS

| | | | |
|---|---|---|---|
| 3,254,287 | 5/1966 | Wolfner | 318/7 X |
| 3,704,401 | 11/1972 | Miller | 318/7 |

*Primary Examiner*—T. E. Lynch

*Attorney, Agent, or Firm*—Haseltine, Lake & Waters

[57] ABSTRACT

An arrangement is provided for the rapid braking of magnetic tapes. The apparatus includes first and second motors adapted for driving and being interconnected through a magnetic tape, the motors being adapted for driving the tape in opposite directions and being further adapted for being switched between on and off conditions. A source of voltage is provided to operate the motors. First and second electronic switches connect the source selectively and respectively to the first and second motors. Further electronic switches interconnect the first motor with the second electronic switch and the second motor with the first electronic switch. A mechanical switch arrangement is provided for controlling the first and second electronic switches. Each motor upon being switched from on to off condition is capable of generating a voltage for a limited period of time which operates through the further electronic switches and the first and second electronic switches to switch on the other of the motors whereby the tape is braked. A delay arrangement is provided which is coupled to the further electronic switches for extending the period of time through which the braking operation is effected. According to one embodiment, a memory assembly is provided for effectively storing the last direction of tape movement and operating to prevent undesired feedback between the motors.

8 Claims, 2 Drawing Figures

PATENTED SEP 16 1975

3,906,299

APPARATUS FOR RAPID BRAKING OF MAGNETIC TAPE

FIELD OF INVENTION

This invention relates to arrangements for the rapid braking of magnetic tapes, and more particularly to braking devices which operate when a rapid transport is switched off in magnetic tape devices having separate direct-current tape winding motors for take-up reels and supply reels.

BACKGROUND

For rewinding magnetic tapes or for searching for particular tape locations, magnetic tape devices are usually provided with a rapid transport device which can transport the tape in both directions at a speed which exceeds by several times the usual recording or replay speed. The braking of such rapid transport operations is achieved by special servomechanisms. Inasmuch as no special tensioning motors are employed, these servomechanisms mechanically brake the winding operation with due regard to maximum permissible tape tension.

If, however, winding motors are employed on the takeup side and on the feed side, it is easier to switch off the driving motor and to activate the driven motor in the opposite direction. A special criterion for tape stop is then necessary to switch off the motor that has been driven up to that point. Otherwise, the tape direction would be reversed and the tape transported in the opposite direction. Such a criterion can be the effective turnabout in rotational direction of one of the two motors. For example, this turnabout in direction of rotation can be sensed by a mechanical sensing device which then finally stops the machine through appropriate contacts.

SUMMARY OF INVENTION

An object of the invention is to replace the above-noted contacts and mechanical sensing devices, which have well-known defects, by a purely electronic arrangement without moving parts.

A further object of the invention is to provide improved arrangements for the rapid braking of magnetic tapes and the like.

To achieve the above and other objects of the invention there is provided an apparatus comprising first and second motors adapted for driving and being interconnected through a magnetic tape, these motors being adapted for driving the tape in opposite directions and being further adapted for being switched between on and off conditions. A source of voltage is provided to operate the motors and first and second electronic switches are provided for connecting the source selectively and respectively to the first and second motors. Further electronic switches are provided for interconnecting the first motor with the second electronic switch and the second motor with the first electronic switch, there being moreover provided mechanical switch arrangements for controlling the first and second electronic switches. Each motor upon being switched from on to off condition is capable of generating a voltage for a limited period of time which operates through the further electronic switches and one of said first and second electronic switches to switch on the other of the motors whereby the tape is braked.

According to a feature of the invention, first and second NOR-gates couple the further electronic switches to said second electronic switch and third and fourth NOR-gates couple the further electronic switches to said first electronic switch, the NOR-gates being coupled by said mechanical switch arrangement to said source.

According to a further feature of the invention, a delay arrangement is provided which is coupled to the further electronic switches and to selected of aforesaid NOR-gates for extending said period of time during which braking is effected.

According to still another feature of the invention, a memory assembly is provided for effectively storing the last direction of tape movement, the storage arrangement being connected to the aforesaid NOR-gates to prevent undesired feed-back between the motors.

Advantageously, the mechanical switch arrangement includes first and second switches for tape advance and rewind respectively, these switches being respectively coupled to the first and third and second and fourth of the NOR-gates as described in detail hereinunder.

Other objects, features and advantages of the invention will be found in the following detailed description.

DETAILED DESCRIPTION

Figure 1:
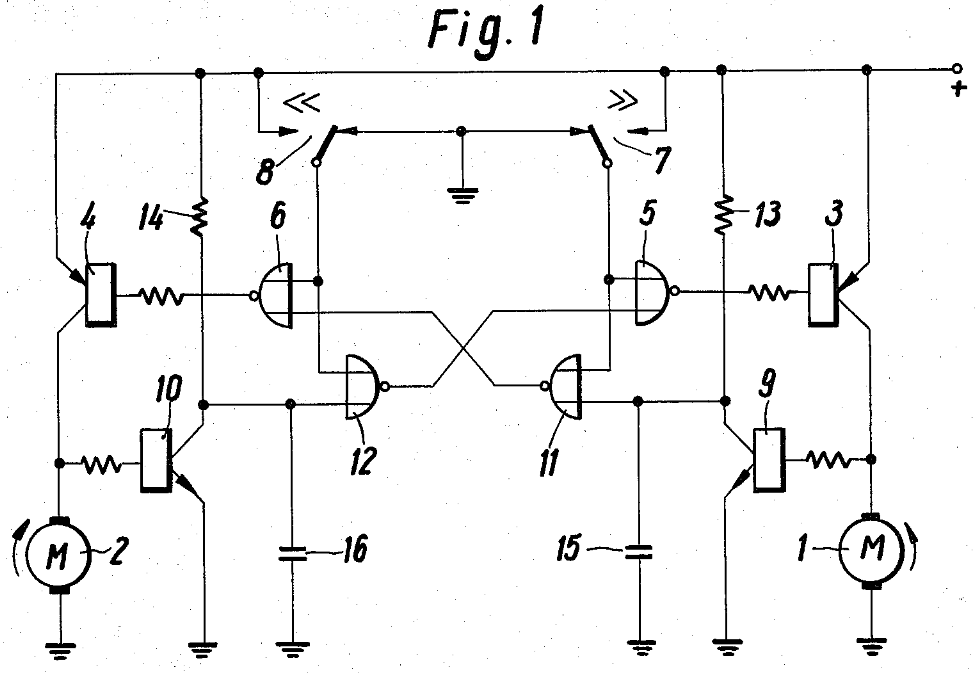
FIG. 1 is a schematic diagram of a circuit for selectively coupling two tape driving motors to a source of voltage in accordance with the invention.

In FIG. 1, component 1 is a winding motor for rapid tape advance and component 2 is a winding motor for rapid tape rewind. Voltage is placed across the motors through transistors 3 and 4, respectively, which act as electronic switches.

In the stopped state, which is shown, the outputs of the NOR-gates 5 and 6 are at 1 so that transistors 3 and 4 are shut off. If then, for example, rapid tape advance is switched on by means of switch 7, transistor 3 is turned on and motor 1 runs at high speed. Transistor 9 simultaneously becomes conducting. The inputs of the NOR-gate 11 have the stage 01 prior to activation of switch 7 and, after activation of switch 7, they run through states 11 and 10. The output of NOR-gate 11 thus remains continuously at 0 and transistor 4 remains continuously shut off.

When rapid tape advance is switched off by means of switch 7, transistor 3 is shut off and, although no current runs through motor 1, the motor continues to run as a consequence of its kinetic energy and generates a generator EMF which holds transistor 9 open. The input of NOR-gate 11 therewith is 00, transistor 4 is switched on, and motor 2 is activated in the direction of the associated arrow. However, motor 2 is now driven contrary to the direction of the arrow by the magnetic tape which couples the tape winding motors. Hence, motor 1 is braked, and consequently also the tape transport. In the meantime, transistor 10 remains blocked. When motor 1 stops, its EMF disappears and transistor 9 is blocked. The output of NOR-gate 11 stands at 0, transistor 4 is shut off, and motor 2 also remains stopped.

The generator-EMF, which is generated during the coasting time of motor 1 naturally depends on the rotational speed and, consequently, becomes extremely small towards the end of the coasting time. In order nevertheless to maintain 0 at the lower input of NOR-gate 11 as well as the braking effect of motor 2, there are provided, in accordance with a feature of the invention, a timing member consisting of resistance 13 (or 14 respectively) and condenser 15 (or 16 respectively). Transistors 9 and 10 can be replaced by high-gain operational amplifiers, which can be controlled by very small generator voltages.

The coupling of motors 1 and 2, effected through the magnetic tape, is a necessary supposition for the functional description up to this point. This is so because, if advance motor 1 is switched on and then again off without a magnetic tape being in the machine, motor 2 then runs at high speed in the direction of the arrow. Transistor 10 simultaneously becomes conductive, the output of the NOR-gate 5 goes to 1, and motor 1 likewise starts up again. Both motors would thus run even though all switches are turned off.

To avoid this condition, a further feature of the invention provides an intermediate storage, where the most recently switched rapid transport function remains stored so long until the other function is switched on. In this way, the high speed running of both winding motors, which occurs without tape, is prevented.

Figure 2:
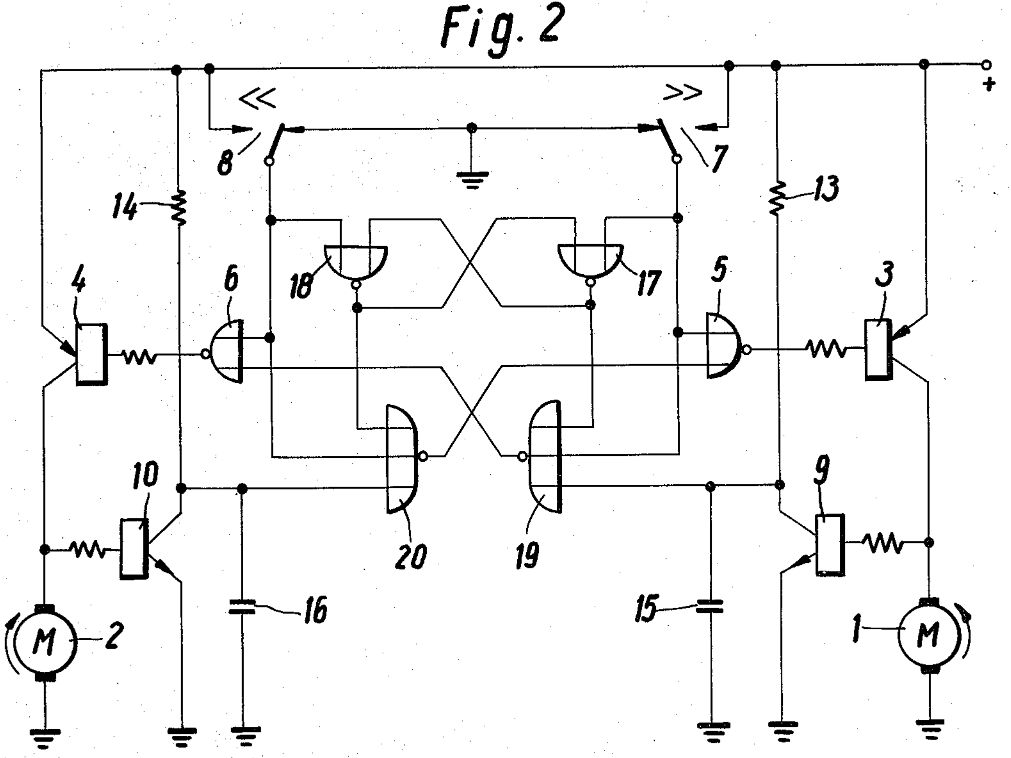
FIG. 2 is a schematic diagram showing a modification of FIG. 1 to provide a supplementary feature whereby feedback between the motors is prevented.

This intermediate storage, according to FIG. 2, consists of the NOR-gates 17 and 18, which are coupled back through an input in such a way that the outputs of NOR-gates 17 and 18 are always opposed. If NOR-gate 17, for example, has output 1 in the stop state, then NOR-gate 18 is 0. If switch 7 is then turned on, NOR-gate 17 has output 0 and NOR-gate 18 has output 1. This state of affairs is not altered if switch 7 is again switched off or is once more switched on. The output 0 at NOR-gate 17 therefore means that switch 7 was activated most recently. The output 0 at NOR-gate 18 signifies that switch 8 was activated most recently. NOR-gate 19 and 20 correspond to gates 11 and 12 but have an additional or third input which receives the outputs of NOR-gates 17 or 18 respectively.

If no magnetic tape is present in the machine and if switch 7 is turned on, motor 2 turns on when switch 7 is switched off, and transistor 10 is turned on, but the top input of NOR-gate 20 is held at L, because of NOR-gate 18 and transistor 3 remains turned off. After motor 1 has stopped, transistor 9 shuts off and motor 2 is also stopped.

From the above it will be seen that the apparatus provided in accordance with the invention comprises first and second motors adapted for driving and being interconnected through a magnetic tape, these motors being adapted for driving the tape in opposite directions and being further adapted for switched between on and off conditions, there being moreover provided a source of voltage to operate these motors and first and second electronic switches for connecting the source selectively and respectively to the first and second motors. Also provided in accordance with the invention are further electronic switches for interconnecting the first motor with the second electronic switch and the second motor with the first electronic switch, there being moreover included mechanical switch means for controlling the first and second electronic switches. Each of the motors upon being switched from on to off condition is capable of generating a voltage for a limited period of time during the coasting of the motor to a halt, which voltage operates through the further electronic switches and the first and second electronic switches to swtich on the other of the motors whereby the tape is braked since the motors operate to drive the tape in opposite directions other than when an idling condition.

There will now be obvious to those skilled in the art many modifications and variations of the circuits set forth hereinabove. These modifications and variations will not depart from the scope of the invention if defined by the following claims.

What is claimed is:

1. Apparatus for the rapid braking of a magnetic tape, when a rapid tape transport switch is switched off in a magnetic tape device including separate and interchangeably operable direct-current tape winding motors one of which drives the tape onto a take-up reel and the other of which is an idling motor which is driven through the tape, and wherein the last idling motor is activated in opposite direction until the tape stops, when the last operated motor is switched off, said apparatus comprising first and second transistors including base-emitter circuits respectively coupled to said motors, and logical connecting circuit means, each said transistor being controlled as to its conductivity by an operating voltage supplied by the associated motor, each said transistor including a collector having a potential adapted to excite the driven motor through said logical connecting circuit when the drive motor is switched off for as long as the induced EMF supplied by the switched off motor exceeds a prescribed value.

2. Apparatus as claimed in claim 1 comprising delay means coupled to respective of the transistors and controlled by the motor voltage to maintain the effect of the motor voltage.

3. Apparatus as claimed in claim 1 comprising intermediate memory means for effectively storing the last activated direction of rapid tape transport, said storage means being coupled to the logical coupling circuit means to prevent feedback between the motors.

4. Apparatus comprising first and second motors adapted for driving and being interconnected through a magnetic tape, said motors being adapted for driving the tape in opposite directions and being further adapted for being switched between on and off conditions, a source of voltage to operate said motors, first and second electronic switch means for connecting said source selectively and respectively to said first and second motors, further electronic switch means for interconnecting the first motor with said second electronic switch means and said second motor with said first electronic switch means, and mechanical switch means for controlling said first and second electronic switch means, each said motor, upon being switched from on to off condition, being capable of generating a voltage for a limited period of time which operates through said further electronic switch means and one of said first and second electronic switch means to switch on the other of said motors whereby the tape is braked.

5. Apparatus as claimed in claim 4 comprising first and second NOR-gates coupling said further electronic switch means to said second electronic switch means and third and fourth NOR-gates coupling said further electronic switch means to said first electronic switch means, said NOR-gates being coupled by said mechanical switch means to said source.

6. Apparatus as claimed in claim 5 comprising delay means coupled to said further electronic switch means and to selected of said NOR-gates for extending said period of time.

7. Apparatus as claimed in claim 6 comprising memory means for effectively storing the last direction of tape movement and connected to said NOR-gates to prevent undesired feedback between said motors.

8. Apparatus as claimed in claim 6 wherein the mechanical switch means includes first and second switches for tape advance and rewide respectively, said switches being respectively coupled to said first and third and to said second and fourth NOR-gates.

* * * * *